Patented Feb. 12, 1952

2,585,356

UNITED STATES PATENT OFFICE 2,585,356

INSECTICIDAL COMPOSITION WITH A WHEAT DUST CARRIER

George B. Wagner, Minneapolis, Minn., assignor to Pillsbury Mills, Inc., Minneapolis, Minn., a corporation of Delaware No Drawing. Application April 11, 1949, Serial No. 86,868

4 Claims. (Cl. 167—42)

This invention relates to improved compositions of matter useful as insecticides and to the methods of preparing and using such compositions.

More particularly, the compositions here described belong to the class of insecticides which are applied in a dry state, preferably as finely divided dusts. Such materials are useful in two distinct fields of economic entomology. The first is the control of insect depredation of truck crops, fruit crops, forage crops and home gardens and greenhouses. The second is the treatment of stored grain to prevent or control infestation by insects.

Dry insecticides suitable for dusting on the leaves and blossoms of plants depend in part for their effectiveness on the presence of properties which cause the material to adhere to the plant and heretofore this has made necessary the addition of spreaders or stickers, or both, to the rock dust or other mineral material which is commonly used as a vehicle for the toxic constituent of powdered insecticides.

The problem of preventing insect infestation in stored grain has been more difficult to solve. It has been necessary heretofore to resort to such practices as fumigation which destroy active insect life but which do not prevent or control the infestation which inevitably re-occurs immediately following the destruction of the insects as the result of invasion of insects from outside of the bins. Moreover, unless the fumigation is very thorough, the eggs and larvae which are contained within the kernels of the grain will not be destroyed.

Efforts have previously been made to control infestation of grain storage bins by mixing with the grain certain forms of aluminum oxide, magnesium oxide and silica. Such materials bring about the death of insects either as the result of change in the moisture content of the body of the insect or as the result of the penetration of sharp points and fragments of the mineral material into the body of the insect. However such efforts have not proved successful because the mineral material cannot be removed from the grain and especially from the crease of the wheat kernel by known commercially feasible methods. Consequently, the ash (mineral) content of the flour, feed or other edible product made from the grain so treated has been extremely high. The use of a combination of an insect toxicant with such mineral vehicles as talc or pyrophyllite also results in an undesirably high ash content in the flour or other edible product made from the treated grain.

One of the organic carriers frequently used in the manufacture of dust insecticides is tobacco dust but this is not used in the treatment of stored grain because of the undesirable flavor which is imparted to the products made from the treated grain. Neither is it possible to use any material which is toxic to humans or other warm blooded animals because of possible contamination of the ground or milled product.

In accordance with the present invention, a dry pulverulent insecticide is made by combining an insect toxicant with a vehicle or carrier consisting of wheat dust which is herein defined as the small particle size material which is removed from the wheat by grain cleaning equipment and which is then picked up by the aspirators and collected by the dust collectors during the cleaning operation which precedes the grinding or milling of wheat into flour or other edible product.

The invention is not restricted to the use of any particular insect toxicant but preferably the toxicant is one which may be mixed with the wheat dust to give a dry powdered product. If the insecticide is to be used in the treatment of stored grain, it will be desirable to choose a toxicant which is relatively harmless to warm blooded animals, but other toxicants can be used in making insecticide dusts for use on crops.

A brief description of the physical structure of the wheat kernel may assist in an understanding of the invention. The substantially oval shaped kernel consists of the bran coat, which is composed of several layers, the germ, and the endosperm which is the part that is ultimately made into flour. There is a deep crease running longitudinally along one side of the kernel and, at the end opposite that which contains the germ, there is a beard consisting of small hairs the cells of which are probably a modification of those forming the outermost layer of the bran coat.

The bran coat consists of six layers of which the outermost two layers, namely the epidermis (or cuticle) and the epicarp, constitute what the miller refers to as "beeswing," a name indicative of its appearance. Although the epidermis and the epicarp are composed of entirely different groups of cells, they are often regarded as a single layer and are referred to herein as the outer envelope of the wheat kernel. The beeswing or outer envelope can be detached from the body of the wheat kernel by mechanical action and, since it is composed principally of cellulose, it has little or no food value.

The milling process, having for its objective the manufacture of flour or other edible products by separation and comminution of the endosperm, commences with a wheat cleaning operation. One of the purposes of the wheat cleaning operation is the removal of extraneous matter from the wheat but equally important is the more or less complete removal of the beeswing or outer envelope. The hairs of the beard of the wheat kernel serve as a repository for a considerable proportion of the dirt which must be removed and effective cleaning therefore requires the stripping off of the outer envelope in which the hairs of the beard are rooted. These hairs, also known in the art as "brush" or "whiskers," are included in the term "outer envelope" as used herein.

The extraneous matter found in wheat consists principally of other cereals, seeds of many kinds, shapes and sizes, stones, chaff, straw, dust and dirt (earth).

To extract these extraneous materials and to remove the outer envelope many different types of devices may be employed in the wheat cleaning department. The sequence of operations usually includes (1) extraction of miscellaneous impurities larger and smaller than wheat by the use of screens and magnets, with aspiration of as much dust and chaff and other light weight impurities as possible, (2) the removal of oats, barley and weed seeds by disc separators, trieur cylinders or gravity separators, (3) washing and conditioning, (4) aspiration of any remaining dust by individual aspirators, (5) scouring, both wet and dry, with combined aspiration and (6) final scouring (polishing) and aspiration, followed in some cases by brushing with aspiration.

In addition, many mills employ centrifugal impact machines in their cleaning and conditioning process which mechanically crack or disrupt the kernels by flinging them against rapidly rotating pegs and against a stationary smooth cylindrical surface or against a serrated stationary ring. Such devices break open imperfect kernels and remove any of the beeswing that may not have been removed by previous treatment. Aspirators are usually combined with these impacting devices to separate the dust including the outer envelope and some very small particles of endosperm, together with any extraneous material held in the crease or other crevices in the wheat kernel.

Virtually all wheat cleaning machines, with the exception of indentation separators of the disc type, include means for aspiration, or separation by ascending air currents, for the purpose of separating dust, chaff, and other light particles from sound wheat. The principle involved is that particles of different size, shape and specific gravity have different terminal velocities in air; a particle falling freely through air is accelerated by gravity until it reaches a speed at which its weight and air resistance are equal, after which it falls at a steady speed known as its terminal velocity. Wheat has a higher terminal velocity than light impurities so that if a mixture of wheat and light impurities is dropped into an air current rising at a suitable speed, the wheat will fall through it and the light impurities will be borne away.

The terminal velocities of typical light impurities and wheat are:

| | Feet per minute |
|---|---|
| Dust, including beeswing | 0 to 500 |
| Chaff | 500 to 700 |
| Light straws and seeds | 700 to 1200 |
| Wheat | 1150 to 1930 |

Aspiration, as the term is employed here, is only used to remove particles with lower terminal velocities than wheat. If the aspiration should be heavy enough to carry over a portion of the wheat it would be necessary to provide secondary aspirators which would remove only the lighter materials.

The air, laden with the lighter particles, flows from the aspirators to dust collectors where the lighter particles are recovered. Various types of dust collectors are in general use in the milling industry. Cyclone dust collectors are representative of the type of dust collectors which accomplish separation of the dust from the air by centrifugal force. Cloth sleeves are also frequently used for separating the dust by filtration. It is also possible to obtain a similar dust by drying the material filtered from water which has been employed in washing wheat.

The wheat dust, whether recovered from air by centrifugal force or from air or water by filtration, or in some other manner, is suitable for use in combination with an insect toxicant in accordance with this invention provided that the particle size of the material is small enough to pass through a 60 mesh screen and preferably small enough to pass through a 100 mesh screen.

That portion of the collected material which will not pass through a fine screen, preferably a 100 mesh screen, i. e., a screen having 100 openings to the linear inch, is removed by screening. If the material removed by the 100 mesh screen, consisting in large part of chaff, does not constitute more than approximately 40% of the total, this may be reduced to the desired size by passing it through any suitable milling device such as a ball mill, hammer mill, attrition mill or roller mill either before or after screening. It is important that the final material shall not contain more than approximately 40% of particles derived from straw, chaff or weed seeds since, even if the latter were pulverized to pass through the same mesh screen, the fiber content of the resulting material would be so high that the material would not be suitable for the purposes of this invention.

In other words, the wheat dust, as that term is defined herein, consists of the material collected as described above having a particle-size sufficiently small to enable it to pass through a 60 mesh screen (or preferably a 100 mesh screen) and may include, in addition, material of similar particle size derived from larger particles collected in the same way, provided that the latter type of material does not constitute more than approximately 40% of the total. The grinding of the larger particles may take place before or after the screening step.

The properties of the wheat dust are very different from the materials that have heretofore been used as vehicles for powdered insect toxicants as will be more readily appreciated from the following observations.

The content of outer envelope (beeswing) is preferably at least 25% of the total wheat dust and in many instances the content of outer envelope may be from 30% to 40% of the total. The wheat dust also contains a substantial proportion of endosperm (carbohydrate material) as the result of the removal, during the wheat cleaning operation, of dirty and unuseable portions of the endosperm. The content of endosperm may range from approximately 15% to approximately 50%, depending on the quality of the wheat. Of equal importance is the fact that the wheat dust contains approximately 2% to 5% of a material extractable by organic solvents which is a mixture of fats and waxes. A content of from 2% to 15% protein, from 2% to 6% ash and a moisture content of from 8% to 12% is also usually present.

The foregoing analytical data is subject to considerable variation depending on the source of the wheat and on whether and to what extent it has been infested by insects prior to treatment. The significance of each of the values given is not entirely understood but special importance is attached to the presence of substantial amounts of the outer envelope and endosperm and an amount of a waxy substance which, while smaller, is nevertheless substantial considering the nature of this material. These constituents of the wheat dust probably account for the unexpected properties which are found when the wheat dust is blended with an insect toxicant and used as an insecticide.

In the preparation of dry powdered insecticides for use by the ultimate user it is customary for the basic insecticide manufacturer to make a relatively concentrated product known as "stock dust" and this is generally purchased by insecticide compounders who make more dilute preparations ready for application by the user. For example, the stock dust which is originally made and distributed to compounders frequently contains about 2% by weight of an insect toxicant such as piperonyl butoxide and about 98% inert carrier and this is diluted by the compounder by the addition of a further quantity of inert carrier so that the final product frequently contains about 0.1% by weight of insect toxicant.

It has been found that wheat dust, derived from grain cleaning operations, serves as a much better carrier for insect toxicants than any that have heretofore been used. The utmost advantage is obtained when it is used first by the basic insecticide manufacturer in the making of stock dust and then by the insecticide compounder for blending with the stock dust to make the final product. In the first instance the wheat dust comprises from 90% to 98% by weight of the total product and in the second instance the wheat dust comprises from 98% to 99.9% of the final powdered insecticide. A somewhat larger particle size range is permitted in the preparation of the final product than in the preparation of the intermediate stock dust. Thus, while that material which passes through a 100 mesh screen is suitable for both uses, the insecticide compounder may use wheat dust which is accepted by a 60 mesh screen. Moreover the manufacturer of the stock dust may, in some cases, prefer only that which is accepted by a 120 mesh screen.

A dry insecticide made by combining from 0.1% to 2% of any of the usual insect toxicants with from 98% to 99.9% of wheat dust, when applied to truck crops, home gardens, flowers and other plants, gives excellent coverage by virtue of the fact that the insecticide settles on the foliage at the proper rate of speed and with a uniform distribution. More especially, the presence of the wheat dust insures that the insecticide will adhere to the leaf and stem surfaces of the plant where the toxicant will be most effective. This adhesiveness of the wheat dust makes it unnecessary to add stickers and spreaders which were formerly considered an essential ingredient of a powered insecticide. It is also noted that, unlike other carriers that have been proposed, the wheat dust does not envelop or coat the toxicant and the latter is therefore not isolated from the insects.

Equally important is the particular virtue possessed by the insecticide herein described for the protection of grain held in bulk storage. The insecticide containing upwards of 98% wheat dust is preferably blended with the grain stream as it enters the storage bin or elevator and it has been found effective in preventing infestation for periods of longer than six months. The insecticide will distribute very uniformly throughout the contents of the bin and it will substantially cover the surfaces of almost every one of the grain kernels. Unlike other powered insecticides, the product made from wheat dust will enter the crevices and interstices in the grain, such as the crease of the wheat kernel, and will prove fatal to insects which gain access to these parts.

When the stored grain thus treated is ready for use it need only be subjected to conventional grain cleaning operations to accomplish the complete removal of the insecticide. The insecticide which is used for preventing infestation of stored grain consists of wheat dust and an insect toxicant which is relatively harmless to humans or other warm blooded animals. Examples of such toxicants are piperonyl butoxide, pyrethrum and rotenone. Even though complete removal is effected in the grain cleaning operation, it is not considered safe practice to treat grain with compounds of arsenic, fluroine, copper and other toxicants which are harmful to humans. Such compounds, as well as dichlorodiphenyltrichlorethane, are however combined with wheat dust in the preparation of dusting powders for agricultural use.

Having thus described the invention, what is claimed as new is:

1. A dry pulverulent insecticide comprising a minor percentage of an organic insect toxicant non-toxic to humans, and a major proportion of a carrier; said carrier consisting substantially of wheat dust obtained as a product by aspiration during the centrifugal impacting stage following the normal wheat dry cleaning and tempering stages, said dust having a particle size sufficiently small to pass through a 100 mesh screen, and wherein the content of outer envelope is at least 25%, the content of endosperm is at least 15%, and the content of waxy material is at least 2% of the total amount of wheat dust.

2. A dry pulverulent insecticide as described in claim 1 wherein the insect toxicant is piperonyl butoxide.

3. A dry pulverulent insecticide as described in claim 1 wherein the insect toxicant is pyrethrum.

4. A dry pulverulent insecticide as described in claim 1 wherein the insect toxicant is rotenone.

GEORGE B. WAGNER.

REFERENCES CITED

The following references are of record in the file of this patent:

UNITED STATES PATENTS

| Number | Name | Date |
|---|---|---|
| 212,835 | Benton | Aug. 19, 1878 |

OTHER REFERENCES

"Journal of Economic Entomology," pages 719 and 764–768, October 1937.